Figure 1:
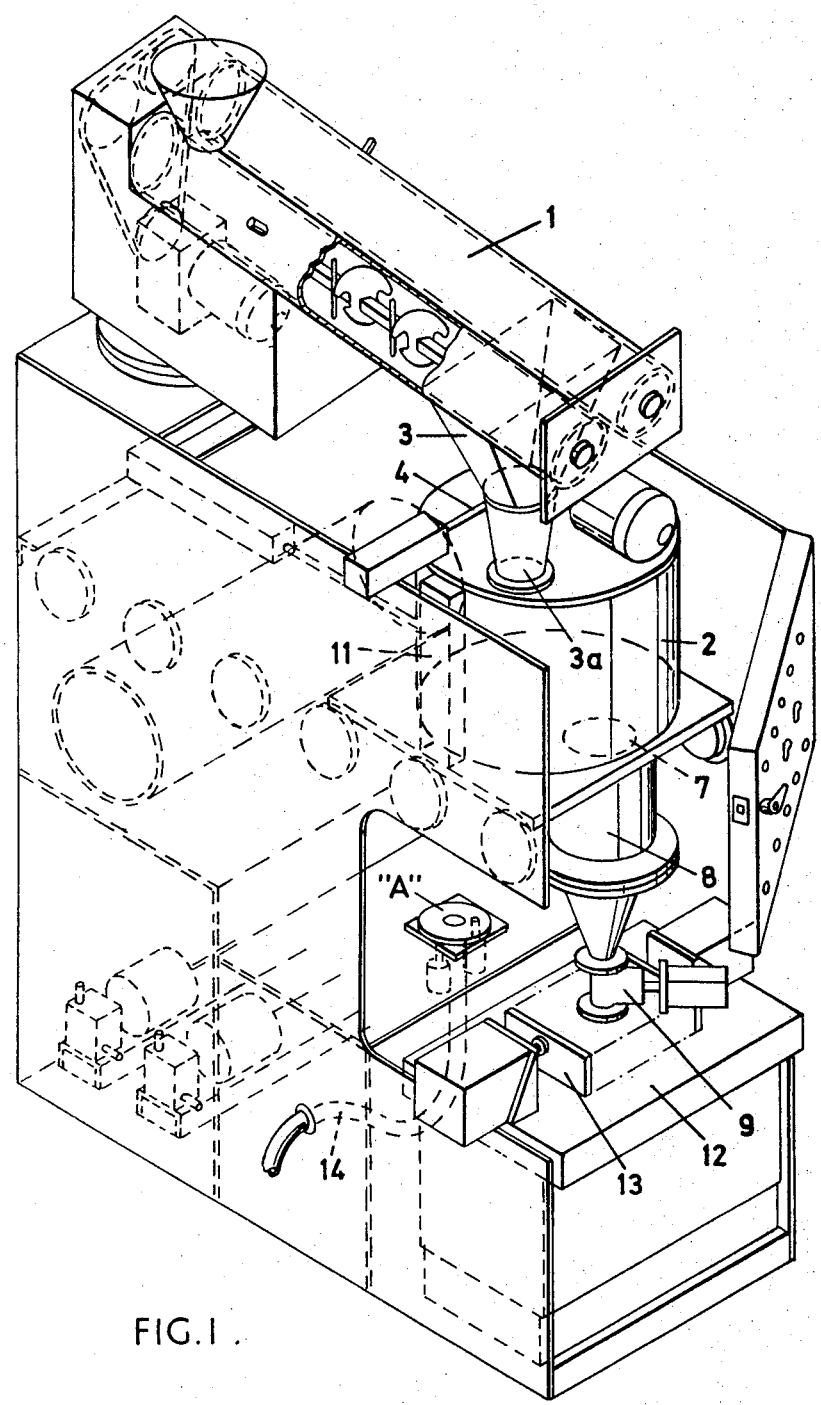

United States Patent [19]
Edwards

[11] 3,834,442
[45] Sept. 10, 1974

[54] METHOD AND APPARATUS FOR THE PREPARATION OF FOUNDRY MOULDS OR CORES

[75] Inventor: Albert Edwards, Peterborough, England

[73] Assignee: Baker Perkins Limited, Peterborough, England

[22] Filed: Aug. 18, 1972

[21] Appl. No.: 281,751

[52] U.S. Cl.................................. 164/21, 164/200
[51] Int. Cl.......................................... B22c 15/24
[58] Field of Search............ 164/19, 20, 21, 22, 37, 164/200, 201, 202

[56] References Cited
UNITED STATES PATENTS

| | | | |
|---|---|---|---|
| 3,439,733 | 4/1969 | Miller et al. | 164/200 |
| 3,494,412 | 2/1970 | Abraham | 164/200 X |
| 3,590,906 | 7/1971 | Bayliss et al. | 164/200 |
| 3,662,812 | 5/1972 | Godding | 164/200 X |
| 3,704,743 | 7/1970 | Edwards | 164/200 X |

Primary Examiner—J. Spencer Overholser
Assistant Examiner—John E. Roethel
Attorney, Agent, or Firm—Larson, Taylor & Hinds

[57] ABSTRACT

A method and apparatus for preparing a foundry mould or core using the cold setting method wherein separate charges of sand and binder mixture on the one hand and sand and catalyst mixture on the other hand are delivered to a mixing chamber in which the separate charges are intermixed to produce a final sand/binder/catalyst mixture. The final mixture is allowed to pass into a communicating blowing chamber and held in the blowing chamber whilst gas under pressure is admitted into the mixing chamber to purge it and at the same time build up pressure on the final mixture in the blowing chamber. When the pressure on the final mixture has reached a suitable blowing level, the communication between the blowing chamber and the mould or core base is opened for blowing the mixture into the box.

8 Claims, 2 Drawing Figures

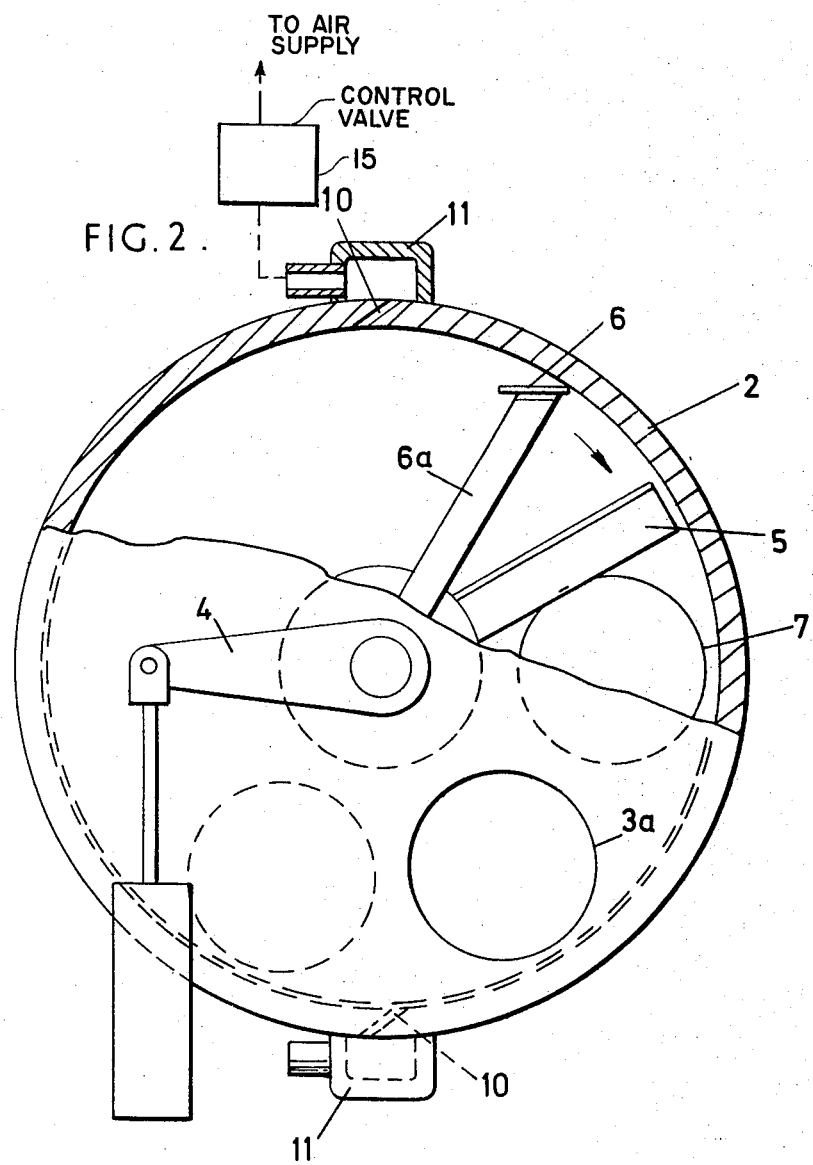

METHOD AND APPARATUS FOR THE PREPARATION OF FOUNDRY MOULDS OR CORES

This invention relates to the preparation of foundry moulds or cores from a cold quick-setting sand/binder/catalyst mixture.

According to the invention we provide a method of preparing a foundry mould or core comprising supplying separate charges of sand and binder mixture and sand and catalyst mixture to a mixing chamber in which the separate charges are mixed to produce a final sand/binder/catalyst mixture, allowing the final mixture to pass from the mixing chamber into a communicating blowing chamber, holding the final mixture in the blowing chamber, whilst gas under pressure is admitted to the mixing chamber to purge the mixing chamber and build up pressure on the final mixture in the blowing chamber, and when said pressure on the mixture has reached a suitable blowing level, opening communication between the blowing chamber and a mould or core box to blow the mixture into the box.

The invention also provides apparatus for preparing a foundry mould or core comprising a mixing chamber, a blowing chamber communicating with the mixing chamber, means for supplying separate charges of sand and binder mixture and sand and catalyst mixture to the mixing chamber, means within the mixing chamber for mixing said charges into a final sand/binder/catalyst mixture and allow said final mixture to pass into the blowing chamber, means for supplying gas under pressure to the mixing chamber to purge the mixing chamber and build up pressure on the final mixture in the blowing chamber, and means for opening communication between the blowing chamber and a mould or core box when said pressure has attained a suitable blowing level to blow the final mixture into the box.

The mixing chamber preferably includes a vertical axis rotary mechanical mixing element, the mixing chamber being adapted to receive the separate charges of sand and binder and sand and catalyst through an inlet in the roof of the mixing chamber and to discharge the final mixture into the blowing chamber through an outlet in the base of the mixing chamber. With a suitable design of mixing element (to be described below) rotating at a suitable speed, it has been found that the separate charges will pass substantially straight through the mixing chamber whilst being fully mixed in about three quarters of a revolution of the mixing element.

When the final mixture has been passed into the blowing chamber, the compressed gas may be supplied to the mixing chamber tangentially through ports in a cylindrical mixing chamber wall to purge the chamber and build up pressure on the final mixture. After the core or mould has been blown, communication between the blowing chamber and the core or mould box may be closed, the mixing chamber and associated blowing chamber moved away from the core or mould box and the blowing chamber opened to release the residual pressure and discharge any remaining final mixture into a suitable receptacle.

The invention will now be described by way of an example with reference to the accompanying drawings in which FIG. 1 is a perspective view of apparatus for preparing foundry moulds and cores and FIG. 2 is a plan view of the mixing chamber.

A pair of continuous screw-type mixer conveyor units 1, for example units of the kind described in our U.K. patent specification No. 1051651 supplied with metered quantities of sand and resin (or any other type of binder) and sand and catalyst respectively, discharge their resultant mixtures into a cylindrical mixing chamber 2 through a divided hopper 3 and an inlet 3a in the roof of the chamber under the control of a plate valve 4. The valve 4 and units 1 operate for a time sufficient to supply an amount of material to the chamber slightly in excess of that required for a mould or core being prepared.

The mixing chamber incorporates a vertical axis rotary mechanical mixing element having a first pair of blades 5 made of spring steel which sweep the base of the chamber, these blades being inclined at about 45 degrees to the vertical, and a second pair of spring steel blades 6 angularly offset from the first pair and which sweep the vertical cylindrical wall of the chamber, the second blades being inclined at about 30 degrees to the chamber radius. The blades 6 are fixedly attached to a cross member 6a which also serves to sweep the roof of the chamber. The mixing element is rotated at about 120 RPM, and it has been found that with this arrangement, as the mixtures from units 1 fall through the mixing chamber they are thoroughly intermixed in about three quarters of a revolution of the mixing element. An outlet 7 in the base of the mixing chamber leading to a blowing chamber 8 is accordingly suitably angularly offset from the inlet 3a.

When the complete charge in its finally mixed state has passed into the blowing chamber 8 it is held there through a closed valve 9 and compressed air is supplied to the mixing chamber through tangentially inclined ports 10 in the vertical mixing chamber wall via manifolds 11. The compressed air purges the mixing chamber of any remaining material and builds up pressure on the final mixture in the blowing chamber. Then, when the pressure reaches a suitable blowing level, the air supply is terminated, e.g., by a suitable control valve such as indicated at block 15, and valve 9 is opened to allow the final mixture to be blown into a mould or core box on a lifting table 12, the box being held by side clamps 13 and to the base of the blowing chamber by lifting table 12. After the core has been blown, valve 9 is again closed, the core or mould box is released and lowered and the mixing chamber 2 with communicating blowing chamber 8 and valve 9 moved to position marked "A" in FIG. 1. Then valve 9 is re-opened to discharge any remaining mixture into a suitable receptacle (not shown) via conduit 14 and to reduce the pressure in the mixing and blowing chambers to atmospheric pressure. The mixing and blowing chambers can then be returned to the original position and the process repeated for another mould or core.

I claim:

1. A method of preparing a foundry mould or core comprising supplying separate charges of sand and binder mixture and sand and catalyst mixture to a mixing chamber in which the separate charges are mixed to produce a final sand/binder/catalyst mixture, allowing the final mixture to pass from the mixing chamber into a communicating blowing chamber, holding the final mixture in the blowing chamber and then blowing the final mixture from the blowing chamber into a mould or core box by (a) supplying gas under pressure solely to said mixing chamber to both purge the mixing chamber and build up pressure on the final mixture in the blowing chamber, (b) terminating the supply of gas when the pressure on the mixture has reached a suitable blowing level, and (c) opening communication between the blowing chamber and the mould or core box to blow the mixture into the box.

2. Apparatus for preparing a foundry mould or core comprising a mixing chamber, a blowing chamber in direct permanent communication with the mixing chamber, means for supplying separate charges of sand and binder mixture and sand and catalyst mixture to the mixing chamber, means within the mixing chamber for mixing said charges into a final sand/binder/catalyst mixture and allowing said final mixture to pass into the blowing chamber, means for supplying gas under pressure solely to the mixing chamber to purge the mixing chamber and build up pressure on the final mixture in the blowing chamber, means for terminating said gas supply when the pressure on the mixture has reached a suitable blowing level and means for opening communication between the blowing chamber and a mould or core box when said pressure has attained said blowing level to blow the final mixture into the box.

3. Apparatus according to claim 2 wherein the mixing chamber includes a vertical axis rotary mechanical mixing element, the mixing chamber being adapted to receive the separate charges of sand and binder and sand and catalyst through an inlet in the roof of the mixing chamber and to discharge the final mixture into the blowing chamber through an outlet in the base of the mixing chamber.

4. Apparatus according to claim 3 wherein means is provided for closing the communication between the blowing chamber and the mould or core box, the mixing chamber and associated blowing chamber being capable of movement away from the mould or core box and the blowing chamber being adapted to be opened to release residual pressure remaining therein and discharge any remaining final mixture into a suitable receptacle.

5. Apparatus according to claim 4 wherein the mixing chamber comprises a vertical cylindrical wall, a base wall with an outlet therein and said vertical axis rotary mixing element comprises a first pair of diametrically opposed spring steel blades adapted to sweep the base of the mixing chamber and a second pair of spring steel blades angularly offset from the first pair adapted to sweep said vertical cylindrical wall.

6. Apparatus according to claim 5 wherein said second pair of blades are fixedly attached to a cross-member which also serves to sweep a roof of the mixing chamber.

7. Apparatus according to claim 6 wherein the outlet of the mixing chamber is offset from an inlet of the mixing chamber through 270° degrees in a direction of rotation of the mixing element.

8. Apparatus according to claim 7 wherein the mixing chamber is provided with tangentially extending ports for connection to a source of compressed gas to purge the chamber and build up pressure on the final mixture in the blowing chamber.

* * * * *